(12) United States Patent
Zhang et al.

(10) Patent No.: US 12,327,395 B2
(45) Date of Patent: Jun. 10, 2025

(54) AGGREGATING NESTED VISION TRANSFORMERS

(71) Applicant: Google LLC, Mountain View, CA (US)

(72) Inventors: Zizhao Zhang, San Jose, CA (US); Han Zhang, Sunnyvale, CA (US); Long Zhao, Mountain View, CA (US); Tomas Pfister, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 406 days.

(21) Appl. No.: 17/664,402

(22) Filed: May 20, 2022

(65) Prior Publication Data

US 2022/0375205 A1 Nov. 24, 2022

Related U.S. Application Data

(60) Provisional application No. 63/192,421, filed on May 24, 2021.

(51) Int. Cl.
*G06V 10/77* (2022.01)
*G06V 10/22* (2022.01)
*G06V 10/44* (2022.01)
*G06V 10/764* (2022.01)

(52) U.S. Cl.
CPC .......... *G06V 10/7715* (2022.01); *G06V 10/22* (2022.01); *G06V 10/44* (2022.01); *G06V 10/764* (2022.01)

(58) Field of Classification Search
CPC .... G06V 10/7715; G06V 10/22; G06V 10/44; G06V 10/764; G06V 10/806; G06V 10/82
See application file for complete search history.

(56) References Cited

PUBLICATIONS

Ze Liu et al.: "Swin Transformer: Hierarchical Vision Transformer using Shifted Windows", arxiv.org, Cornell University Library, 201 Olin Library Cornell University Ithaca; NY 14853, Mar. 25, 2021 (Mar. 25, 2021), XP081916852, 13 pages (Year: 2021).*

(Continued)

*Primary Examiner* — Matthew C Bella
*Assistant Examiner* — Janice E. Vaz
(74) *Attorney, Agent, or Firm* — DORITY & MANNING P.A.

(57) ABSTRACT

A method includes receiving image data including a series of image patches of an image. The method includes generating, using a first set of transformers of a vision transformer (V-T) model, a first set of higher order feature representations based on the series of image patches and aggregating the first set of higher order feature representations into a second set of higher order feature representations that is smaller than the first set. The method includes generating, using a second set of transformers of the V-T model, a third set of higher order feature representations based on the second set of higher order feature representations and aggregating the third set of higher order feature representations into a fourth set of higher order feature representations that is smaller than the third set. The method includes generating, using the V-T model, an image classification of the image based on the fourth set.

18 Claims, 5 Drawing Sheets

(56) References Cited

PUBLICATIONS

Haotian Yan et al: "ConTNet: Why not use convolution and transformer at the same time?", arxiv.org, May 10, 2021 (May 10, 2021), XP081956385, 12 pages. (Year: 2021).*

Ze Liu et al., "Swin Transformer: Hierarchical Vision Transformer using Shifted Windows", arxiv.org, Cornell University Library, 201 Olin Library Cornell University Ithaca, NY 14853, Mar. 25, 2021, XP081916852, 13 pages (Year: 2021).*

Haotian Yan et al.: "ConTNet: Why not use convolution and transformer at the same time?", arxiv.org, May 10, 2021, XP081956385, 12 pages (Year: 2021).*

International Search Report and Written Opinion of Application No. PCT/US2022/072515 dated Aug. 31, 2022, 118 pages.

Ze Liu et al: "Swin Transformer: Hierarchical Vision Transformer using Shifted Windows", arxiv.org, Cornell University Library, 201 Olin Library Cornell University Ithaca; NY 14853, Mar. 25, 2021 (Mar. 25, 2021), XP081916852, 13 pages.

Wenhai Wang et al: "Pyramid Vision Transformer: A Versatile Backbone for Dense Prediction without Convolutions", arxiv.org, Cornell University Library, 201 Olin Library Cornell University Ithaca, NY 14853, Feb. 24, 2021 (Feb. 24, 2021), XP081891547, 13 pages.

Kevin Lin et al: "End-to-End Human Pose and Mesh Reconstruction with Transformers", arxiv.org, Cornell University Library, 201 Olin Library Cornell University Ithaca, NY 14853, Mar. 28, 201 (Mar. 28, 2021), XP081901573, 17 pages.

Ben Graham et al: "LeViT: a Vision Transformer in ConvNet's Clothing for Faster Inference", arxiv.org, Cornell University Library, 201 Olin Library Cornell University Ithaca, NY 14853, May 6, 2021 (May 6, 2021), XP081954790, 16 pages.

Haotian Yan et al: "ConTNet: Why not use convolution and transformer at the same time?", arxiv.org, May 10, 2021 (May 10, 2021), XP081956385, 12 pages.

Ling Xufeng Lingxufeng@Qq Com et al: "A Self-Attention Based Methd for Facial Expression Recognition", The 16th International Conference on Availability, Reliability and Security, ACMPUB27, New York, NY, USA, Apr. 23, 2021 (Apr. 23, 2021), pp. 191-195, XP058656745, DOI: 10.1145/3467707.3467735 ISBN: 978-1-4503-8950-1, 5 pages.

Salman Khan et al: "Transformers in Vision: A Survey", arxiv.org, Cornell University Library, 201. Olin Library Cornell University Ithaca, NY 14853, Feb. 22, 2021 (Feb. 22, 2021), XP081883407, 28 pages.

* cited by examiner

Algorithm Pseudo Code

```
# embed and block image to (#block, seqlen, d)
x = Block(PatchEmbed(input_image))

for i in range(num_hierarchy):
    # apply transformer layers T_i within each block
    # with positional encodings (PE)
    y = Stack([T_i(x[0] + PE_i[0]), ... 1])
    if i < num_hierarchy - 1:
        # aggregate blocks and reduce #block by 4
        x = Aggregate(y, i)

h = GlobalAvgPool(x)   # (1, seqlen, d) to (1, 1, d)
logits = Linear(h[0, 0])   # (num_classes,)

def Aggregate(x, i):
    z = UnBlock(x)   # unblock seqs to (h, w, d)
    z = ConvNormMaxPool_i(x)   # (h/2, w/2, d)
    return Block(z)   # block to seqs
```

AGGREGATING NESTED VISION TRANSFORMERS

CROSS REFERENCE TO RELATED APPLICATIONS

This U.S. patent application claims priority under 35 U.S.C. § 119(e) to U.S. Provisional Application 63/192,421, filed on May 24, 2021 The disclosure of this prior application is considered part of the disclosure of this application and is hereby incorporated by reference in its entirety.

TECHNICAL FIELD

This disclosure relates to vision transformers.

BACKGROUND

Transformers were originally designed for natural language processing (NLP) tasks while convolutional neural networks (CNN) dominated vision tasks. Transformers are capable of building dependencies using sequential data. Recently, vision transformers targeted at vision process tasks (e.g., image recognition or classification) have shown great success versus conventional CNNs. Hierarchical structures are popular in vision transformers, but these require sophisticated designs and significant quantities of data to perform well.

SUMMARY

One aspect of the disclosure provides a computer-implemented method for aggregating nested vision transformers. The computer-implemented method, when executed by data processing hardware, causes the data processing hardware to perform operations. The operations include receiving image data including a series of image patches of an image. Each image patch of the series of image patches includes a different portion of the image. The operations include generating, using a first set of transformers of a vision transformer (V-T) model, a first set of higher order feature representations based on the series of image patches and aggregating the first set of higher order feature representations into a second set of higher order feature representations that is smaller than the first set of higher order feature representations. The operations also include generating, using a second set of transformers of the V-T model, a third set of higher order feature representations based on the second set of higher order feature representations and aggregating the third set of higher order feature representations into a fourth set of higher order feature representations that is smaller than the third set of higher order feature representation. The operations also include generating, using the V-T model, an image classification of the image based on the fourth set of higher order feature representations.

Implementations of the disclosure may include one or more of the following optional features. In some implementations, each image patch of the series of image patches is non-overlapping. Optionally, aggregating the first set of higher order feature representations into the second set of higher order feature representations includes performing a convolutional operation and performing a pooling operation. In some examples, each transformer of the first set of transformers includes a multi-head self-attention layer, a feed-forward fully-connected network layer with skip-connection, and a normalization layer.

In some implementations, the second set of higher order feature representations is smaller than the first set of higher order feature representations by a factor of four. The fourth set of higher order feature representations may be smaller than the third set of higher order feature representations by a factor of four. In some examples, each higher order feature in the first set of higher order features is non-overlapping.

Optionally, aggregating the first set of higher order feature representations includes communicating non-local information corresponding to each higher order feature representation in the first set of higher order feature representations. Aggregating the second set of higher order feature representations may include communicating non-local information corresponding to each higher order feature representation in the third set of higher order feature representations. In some implementations, aggregating the first set of higher order feature representations into the second set of higher order feature representations includes performing a plurality of spatial operations.

Another aspect of the disclosure provides a system for aggregating nested vision transformers. The system includes data processing hardware and memory hardware in communication with the data processing hardware. The memory hardware stores instructions that when executed on the data processing hardware cause the data processing hardware to perform operations. The operations include receiving image data including a series of image patches of an image. Each image patch of the series of image patches includes a different portion of the image. The operations include generating, using a first set of transformers of a vision transformer (V-T) model, a first set of higher order feature representations based on the series of image patches and aggregating the first set of higher order feature representations into a second set of higher order feature representations that is smaller than the first set of higher order feature representations. The operations also include generating, using a second set of transformers of the V-T model, a third set of higher order feature representations based on the second set of higher order feature representations and aggregating the third set of higher order feature representations into a fourth set of higher order feature representations that is smaller than the third set of higher order feature representation. The operations also include generating, using the V-T model, an image classification of the image based on the fourth set of higher order feature representations.

This aspect may include one or more of the following optional features. In some implementations, each image patch of the series of image patches is non-overlapping. Optionally, aggregating the first set of higher order feature representations into the second set of higher order feature representations includes performing a convolutional operation and performing a pooling operation. In some examples, each transformer of the first set of transformers includes a multi-head self-attention layer, a feed-forward fully-connected network layer with skip-connection, and a normalization layer.

In some implementations, the second set of higher order feature representations is smaller than the first set of higher order feature representations by a factor of four. The fourth set of higher order feature representations may be smaller than the third set of higher order feature representations by a factor of four. In some examples, each higher order feature in the first set of higher order features is non-overlapping.

Optionally, aggregating the first set of higher order feature representations includes communicating non-local information corresponding to each higher order feature representation in the first set of higher order feature representations.

Aggregating the second set of higher order feature representations may include communicating non-local information corresponding to each higher order feature representation in the third set of higher order feature representations. In some implementations, aggregating the first set of higher order feature representations into the second set of higher order feature representations includes performing a plurality of spatial operations.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Transformers were originally designed for natural language processing (NLP) tasks while convolutional neural networks (CNN) dominated vision tasks. Transformers are capable of building dependencies using sequential data. Recently, vision transformers targeted at vision process tasks (e.g., image recognition or classification) have shown great success versus conventional CNNs. Hierarchical structures are popular in vision transformers, but these require sophisticated designs and significant quantities of data to perform well. For example, vision transformers require training over hundreds of millions of images to generalize well, which is a substantial limitation.

Vision transformers generally first split an input image into patches and each patch is treated in a manner similar to tokens in NLP applications. Then, several self-attention layers conduct global information communication to extract features for classification. Using enormous datasets (e.g., hundreds of millions of images), these vision transformers rival or exceed state-of-the-art CNNs. Unfortunately, these vision transformers, when trained on smaller datasets, tend to show worse performance compared to their CNN counterparts.

Lack of inductive bias, such as locality and translation equivariance, is one explanation for the data inefficiency of conventional vision transformers. Transformer models learn locality behaviors in a deformable convolution manner where bottom layers attend locally to the surrounding pixels and top layers favor long-range dependency. On the other hand, global self-attention between pixel pairs in high-resolution images is computationally expensive. While reducing the self-attention range may make these vision transformers train more efficiently, this generally leads to complex architectures.

Implementations herein are directed toward a system using nested hierarchical transformers for vision tasks (e.g., image classification). Instead of reducing self-attention range, the system maintains the self-attention range and introduces an aggregation function to improve accuracy and data efficiency while also providing interpretability benefits (i.e., the feature learning and abstraction are decoupled), a substantially simplified architecture, and effective cross-block communication. The system is effective for vision tasks such as image classification, but also may be extended or repurposed into a strong decoder that provides increased performance with comparable speed relative to CNNs.

The system includes at least one set of transformers configured to classify images. The system receives, as input to a vision transformer (V-T) model, image data and processes the image data to produce a series of image patches. The V-T model generates, using a first set of transformers (e.g., sixteen transformers), a first set of higher order feature representations. The first set of higher order feature representations output by the first set of transformers are then aggregated into a second set of higher order feature representations for input to a second set of transformers (e.g., four transformers). The second set of transformers generates a third set of higher order feature representations, which are aggregated into a fourth set of higher order feature representations. By using this aggregating nesting hierarchy, the V-T model architecture obtains improved performance and data efficiency compared to both standard vision transformer models as well as standard CNNs.

Figure 1:
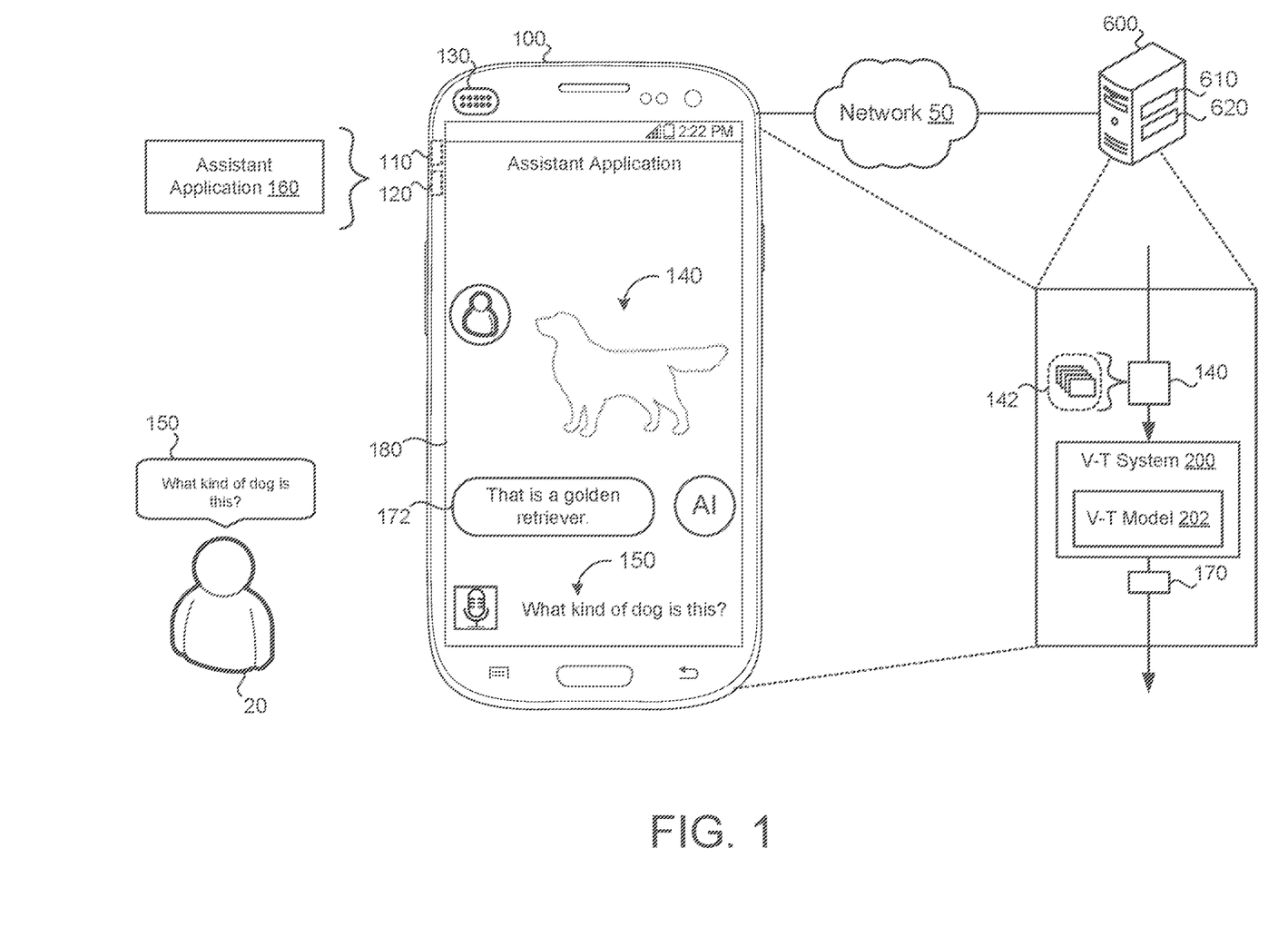
FIG. 1 is a schematic view of an example vision environment.

FIG. 1 illustrates an example of a vision environment 10. In the vision environment 10, a user 20 interacts with a user device 100, such as a hand-held user device as shown or any other type of computing device. The user device 100 may correspond to any computing device, such as a desktop workstation, a laptop workstation, or a mobile device (i.e., a smart phone). The user device 100 includes computing resources 110 (e.g., data processing hardware) and/or storage resources 120 (e.g., memory hardware). The interaction of the user 20 may be through a camera 130 located on the user device 100 and configured to capture images 140 within the vision environment 10. In the example shown, the user 20 captures an image 140 of a dog (via the camera 130) and asks a classification word or phrase 150, such as "What kind of dog is this?", to an assistant application 160 executing on the data processing hardware 110 of the user device 100. The interaction of the user 20 may be through any other applicable means, such as downloading or otherwise receiving an image from a remote source (e.g., via a web search, email, text message, or other application executing on the user device 100).

A V-T system 200 executes on the data processing hardware 110 of the user device 100 and/or on another computing system 600 in communication with the user device 100, e.g., through a network 50. The computing system 600 may be a single computer, multiple computers, or a distributed system (e.g., a cloud environment) having scalable/elastic resources 610 including computing resources 610 (e.g., data processing hardware) and/or storage resources 620 (e.g., memory hardware). The V-T system 200 includes a V-T model 202.

The V-T model 202 receives, as input, image patches 142 of the image 140 capable of being processed by the V-T system 200. Each image patch 142 is a contiguous portion of the image 140. Each image patch 142 may be an equal portion of the image 140 (e.g., one-fourth of the image 140, one-eighth of the image 140, etc.) that combine to represent the entire image 140. In some examples, each image patch 142 is non-overlapping with each other image patch 142. Here, the V-T model 202 receives the image patches 142 of the image 140 of the dog provided by the user device 100. Thereafter, the V-T model 202 may generate/predict, as output, an image classification 170 (e.g., as text or a noise vector). In the example shown, the assistant application 160 responds with an indication 172 of the image classification 170. In the example shown, the assistant application 160 indicates "That is a golden retriever," which is displayed on a screen 180 in communication with the data processing hardware 110 of the user device 100 and/or audibly spoken to the user 20.

Figure 2:
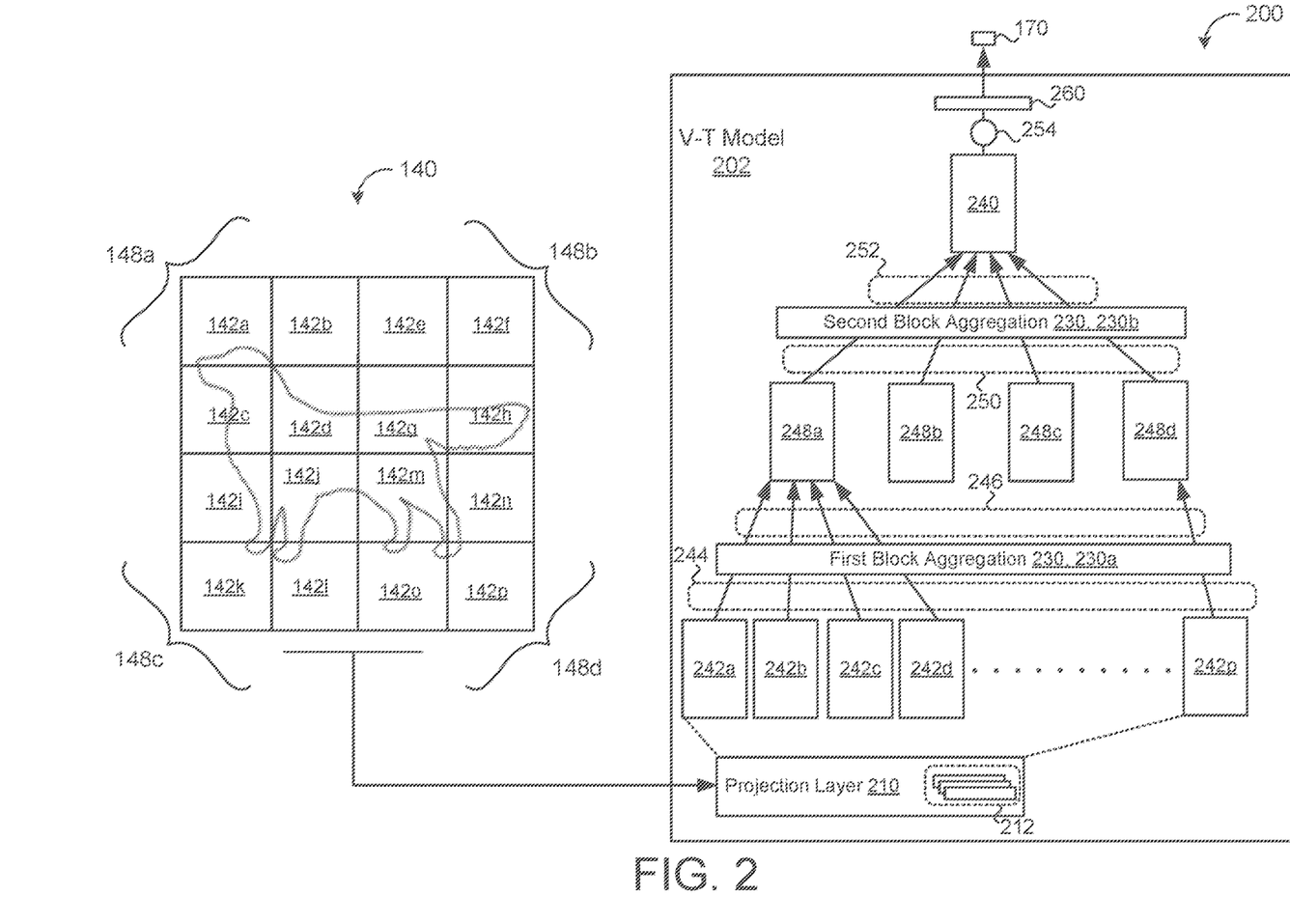
FIG. 2 is a schematic view of an example vision transformer (V-T) model.

Referring now to FIG. 2, the V-T system 200, in this example, divides the image 140 into a series of sixteen image patches 142, 142a-p. Here, the image 140 is divided equally among each of the sixteen image patches 142. Thus, each quadrant 148, 148a-d of the image 140 includes four image patches 142. For example, a first quadrant 148a includes image patches 142a-d, a second quadrant 148b includes image patches 142e-h, a third quadrant 148c includes image patches 142i-l and a fourth quadrant 148d includes image patches 142m-p.

The V-T model 202 includes a projection layer 210. The projection layer 210 receives the image patches 142 and linearly projects each image patch 142 into a word vector 212. Each word vector 212 is then input to a respective transformer 242, 242a-p of a first set of transformers 242. Thus, each transformer 242 processes a word vector 212 that corresponds to one of the image patches 142. In this example, there are sixteen image patches 142 and accordingly sixteen transformers 242 in the first set of transformers 242, however the V-T model 202 may include any number of transformers 242 to support any number of image patches 142 (e.g., 4, 8, 16, 32, 64, etc.). Each transformer 242 of the first set of transformers 242 outputs or generates a higher order feature representation 244.

A first block aggregation layer 230, 230a receives the first set of higher order feature representations 244 and aggregates (e.g., via simple spatial operations such as one or more convolution operations and one or more pooling operations) the first set of higher order feature representations 244 into a second set of higher order feature representations 246. A second set of transformers 248, 248a-d receives the second set of higher order feature representations 246. Here, the first block aggregation 230a layer aggregates the higher order feature representations 244 generated by the transformers 242a-d that represent the first quadrant 148a of the image 140. While not shown, the first block aggregation layer 230 similarly aggregates the higher order feature representations 244 generated by the remaining twelve transformers 242. A first transformer 248, 248 of the second set of transformers 248 receives the higher order feature representations 246 aggregated from the higher order feature representations 244 generated by the transformers 242a-d. In a similar manner, a second transformer 248, 248b; a third transformer 248, 248c; and a fourth transformer 248, 248d receive corresponding higher order feature representations 246 aggregated from respective higher order feature representations 244 generated by the remaining transformers 242e-p (not shown).

The outputted second set of higher order feature representations 246 are input to a second set of transformers 240, which output a third set of higher order feature representations. The third set of higher order feature representations are then aggregated by the second block aggregation layer 230b to generate the fourth set of higher order feature representations. The third set of transformers receives the fourth set of higher order feature representations and generates the image classification 170. While the number of transformers 242, 248 and the amount of higher order feature representations 244, 246 may vary, the second set of higher order feature representations 246 is smaller than the first set of higher order feature representations 244. That is, the first block aggregation layer 230 aggregates the first set of higher order feature representations 244 into a smaller second set of higher order feature representations 246 (e.g., by a factor of four) while allowing cross-block communication on the image (i.e., feature map) plane. In this example, the first set of sixteen transformers 242a-p generate a first set of higher order feature representations 244 that is aggregated into a second set of higher order feature representations 246 that is provided to the second set of four transformers 248a-d. Here, each transformer 248 in the second set of transformers 248 receives higher order feature representations 246 representative of a corresponding quadrant 148 of the image 140.

The second set of transformers 248, using the second set of higher order feature representations 246, generate or determine a third set of higher order feature representations 250. A second block aggregation layer 230, 230b aggregates the third set of higher order feature representations 250 into a fourth set of higher order feature representations 252. While the quantity of both the third set of higher order feature representations 250 and the fourth set of higher order feature representation 252, the fourth set of higher order feature representations 252 is smaller than the third set of higher order feature representations 252 (e.g., by a factor of four). In this example, the four transformers 242 each generate higher order feature representations 250 that is aggregated (i.e., by the second block aggregation 230b) into the fourth set of higher order feature representations 252 for a third set of transformers 240. In this example, the third set of transformers 240 includes only a single transformer 240 that receives the fourth set of higher order feature representations 252, although the third set of transformers 240 may include any number of transformers 240. Here, the fourth set of higher order feature representations 252 represents the entire image 140 and thus the transformer 240 receives the higher order feature representations 252 that represent the entirety of the image 140. Each higher order feature in any of the sets of higher order feature representations 244, 246, 250, 252 may be non-overlapping with each other higher order feature representation.

The third set of transformers 240 determine or generate a fifth set of higher order feature representations 254. The VT-Model 202 provides the fifth set of higher order feature representations 254 to a network 260 (e.g., a classification head) that uses the fifth set of higher order feature representations 254 to generate the image classification 170. In some examples, the network 260 is a feed-forward fully-connected network (FFN), a feed-forward artificial neural network (ANN), a multilayer perceptron network (MLP), etc. The network 260 generates the image classification 170.

The transformers of the first set of transformers 242, the second set of transformers 248, and the third set of transformers 240 may be identical or different. For example, each transformer 242, 248, 240 includes a multi-head self-attention (e.g., a multiple sequence alignment (MSA)) transformer followed by an FNN with a skip-connection and/or a normalization layer. Based on the use case of the V-T system 200 and the V-T model 202, the V-T model 202 may include more or less "layers" of transformers. For example, the image 140 is divided into thirty-two image patches 142 and an extra layer of transformers and an extra block aggregation layer 230 is included in the V-T model 202. Each aggregation block layer 230 allows each transformer 242 to maintain independence while allowing cross-block non-local information communication and selection. That is, aggregating the first set of higher order feature representations 244 may include communicating non-local information corresponding to each higher order feature representation 244 in the first set of higher order feature representations 244. Similarly, aggregating the third set of higher order feature representations 250 includes communicating non-local information corresponding to each higher order feature representation 250 in the third set of higher order feature representations 250.

In some examples, each block aggregation layer 230 includes a convolution (e.g., a 3×3 convolution) followed by layer normalization and a max pooling (e.g., a 3×3 max pooling). In some examples, the block aggregation is applied on the image plan (i.e., full image feature maps) as opposed to the block plane (i.e., partial feature maps corresponding to blocks that will be merged) so that information is exchanged between nearby blocks.

Figure 3:
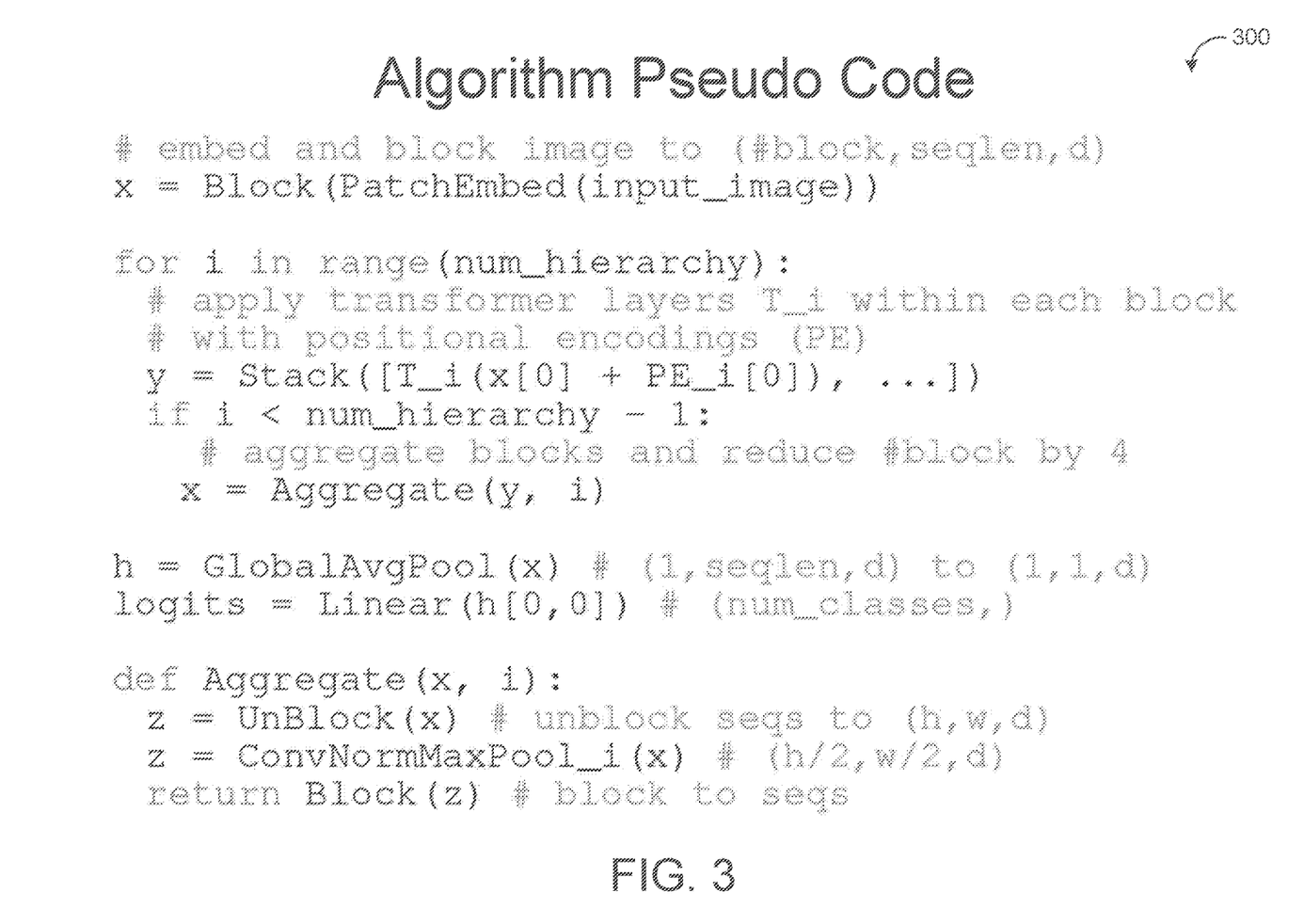
FIG. 3 provides example pseudo code for nested vision transformers.

Referring now to FIG. 3, an exemplary algorithm 300 executed by the V-T model 202 classifies images 140. Here, the V-T model 202, for each input to a transformer in a set of transformers (e.g., transformers 242, 248, 240), applies the transformer layers with positional encodings and stacks higher order feature representations (e.g., higher order feature representations 244, 246, 250, 252). The V-T model 202 aggregates the higher order feature representations and reduces the number of higher order feature representations by a factor of four. In other examples, the V-T model reduces the number of higher order feature representations by other factors (e.g., two, eight, sixteen, etc.). Per the algorithm 300, each node T, processes an image block. Block aggregation is performed between hierarchies to achieve cross-block communication of the image (i.e., feature map) plane. Here, the number of hierarchies is equal to three.

The algorithm 300 is suitable for complex learning tasks. For example, the algorithm 300 is extended to provide a decoder for generative modeling with superior performance to traditional convolutional decoders and other transformer-based decoders. Transposing the nested transformers of the algorithm 300 (and the V-T model 202) provides an effective image generator. Here, the input is reshaped as a noise vector and the output is a full-sized image. To support the gradually increased number of blocks, the block aggregation layer 230 is replaced with appropriate block de-aggregation (i.e., up-sampling feature maps) such as pixel shuffles. In this scenario, the number of blocks increases by a factor of four each hierarchy.

The nested hierarchy of the V-T model 202 resembles a decision tree in which each block is encouraged to learn non-overlapping features to be selected by block aggregation. Gradient-based class-aware tree-traversal techniques, using the V-T model 202, may find the most valuable traversal from a child node to the root node that contributes the most to the classification logits. Corresponding activation and class-specific gradient features allow for the tracing of high-value information flow recursively from the root to a leaf node to enable vision interpretability.

Figure 4:
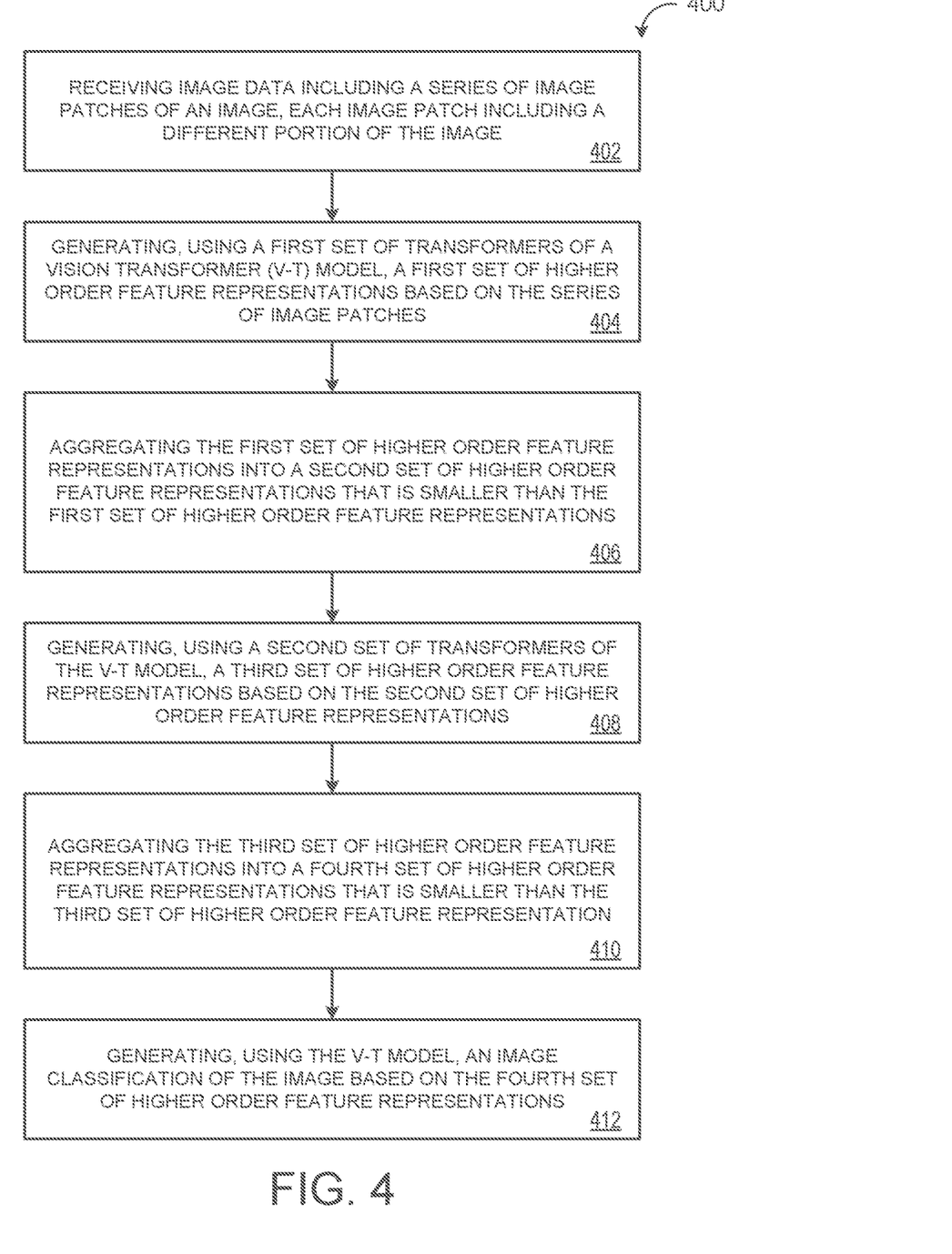
FIG. 4 is a schematic view of an example arrangement of operations for a method that when executed by data processing hardware causes the data processing hardware to perform operations for classifying an image.

FIG. 4 provides an example arrangement of operations for a method 400 of aggregating nested vision transformers. The method 400 may execute on the data processing hardware 110, 610 of the user device 100 and/or computing system 600 of FIG. 1. The method 400, at operation 402, includes receiving image data including a series of image patches 142 of an image 140. Each image patch 142 of the series of image patches 142 includes a different portion of the image 140. The method 400, at operation 404, includes generating, using a first set of transformers 242 of a vision transformer (V-T) model 202, a first set of higher order feature representations 244 based on the series of image patches 142 and, at operation 406, aggregating the first set of higher order feature representations 244 into a second set of higher order feature representations 246 that is smaller than the first set of higher order feature representations 244. The method 400, at operation 408, includes generating, using a second set of transformers 248 of the V-T model 202, a third set of higher order feature representations 250 based on the second set of higher order feature representations 246 and, at operation 410, aggregating the third set of higher order feature representations 250 into a fourth set of higher order feature representations 252 that is smaller than the third set of higher order feature representation 250. The method 400, at operation 412, includes generating, using the V-T model 202, an image classification 170 of the image 140 based on the fourth set of higher order feature representations 252.

Figure 5:
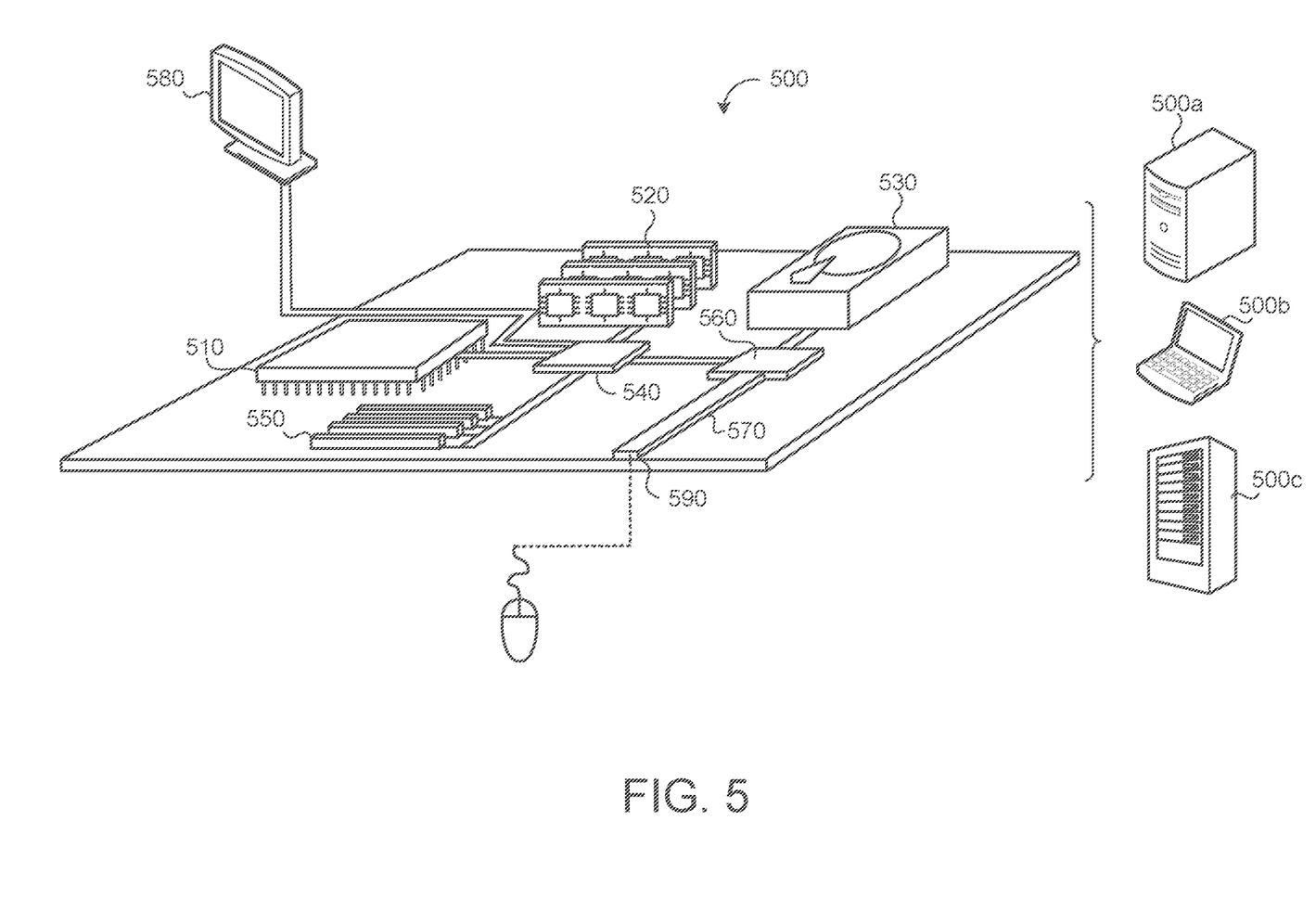
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The computing device 500 may include the user device 100 of FIG. 1, the computing system 600 of FIG. 1, or some combination thereof. The components shown here, their connections and relationships, and their functions, are meant to be exemplary only, and are not meant to limit implementations of the inventions described and/or claimed in this document.

The computing device 500 includes a processor 510 (data processing hardware) (e.g., data processing hardware 110, 610 of FIG. 1), memory 520 (memory hardware) (e.g., memory hardware 120, 620 of FIG. 1), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising
receiving image data comprising a series of image patches of an image, each image patch of the series of image patches comprising a different portion of the image;
generating, using a first set of transformers of a vision transformer (V-T) model, a first set of higher order feature representations based on the series of image patches;
aggregating the first set of higher order feature representations into a second set of higher order feature representations, the second set of higher order feature representations smaller than the first set of higher order feature representations, wherein aggregating the first set of higher order feature representations into the second set of higher order feature representations comprises performing a convolutional operation and performing a pooling operation;
generating, using a second set of transformers of the V-T model, a third set of higher order feature representations based on the second set of higher order feature representations;
aggregating the third set of higher order feature representations into a fourth set of higher order feature representations, the fourth set of higher order feature representations smaller than the third set of higher order feature representation, and
generating, using the V-T model, an image classification of the image based on the fourth set of higher order feature representations.

2. The method of claim 1, wherein each image patch of the series of image patches is non-overlapping.

3. The method of claim 1, wherein each transformer of the first set of transformers comprises:
a multi-head self-attention layer;
a feed-forward fully-connected network layer with skip-connection; and
a normalization layer.

4. The method of claim 1, wherein the second set of higher order feature representations is smaller than the first set of higher order feature representations by a factor of four.

5. The method of claim 1, wherein the fourth set of higher order feature representations is smaller than the third set of higher order feature representations by a factor of four.

6. The method of claim 1, wherein each higher order feature representation in the first set of higher order feature representations is non-overlapping.

7. The method of claim 1, wherein aggregating the first set of higher order feature representations comprises communicating non-local information corresponding to each higher order feature representation in the first set of higher order feature representations.

8. The method of claim 1, wherein aggregating the third set of higher order feature representations comprises communicating non-local information corresponding to each higher order feature representation in the third set of higher order feature representations.

9. The method of claim 1, wherein aggregating the first set of higher order feature representations into the second set of higher order feature representations comprises performing a plurality of spatial operations.

10. A system comprising:
data processing hardware; and
memory hardware in communication with the data processing hardware, the memory hardware storing instructions that when executed on the data processing hardware cause the data processing hardware to perform operations comprising:
receiving image data comprising a series of image patches of an image, each image patch of the series of image patches comprising a different portion of the image;
generating, using a first set of transformers of a vision transformer (V-T) model, a first set of higher order feature representations based on the series of image patches;
aggregating the first set of higher order feature representations into a second set of higher order feature representations, the second set of higher order feature representations smaller than the first set of higher order feature representations, wherein aggregating the first set of higher order feature representations into the second set of higher order feature representations comprises performing a convolutional operation and performing a pooling operation;
generating, using a second set of transformers of the V-T model, a third set of higher order feature representations based on the second set of higher order feature representations;
aggregating the third set of higher order feature representations into a fourth set of higher order feature representations, the fourth set of higher order feature representations smaller than the third set of higher order feature representation; and
generating, using the V-T model, an image classification of the image based on the fourth set of higher order feature representations.

11. The system of claim 10, wherein each image patch of the series of image patches is non-overlapping.

12. The system of claim 10, wherein each transformer of the first set of transformers comprises:
a multi-head self-attention layer;
a feed-forward fully-connected network layer with skip-connection; and
a normalization layer.

13. The system of claim 10, wherein the second set of higher order feature representations is smaller than the first set of higher order feature representations by a factor of four.

14. The system of claim 10, wherein the fourth set of higher order feature representations is smaller than the third set of higher order feature representations by a factor of four.

15. The system of claim 10, wherein each higher order feature representation in the first set of higher order feature representations is non-overlapping.

16. The system of claim 10, wherein aggregating the first set of higher order feature representations comprises communicating non-local information corresponding to each higher order feature representation in the first set of higher order feature representations.

17. The system of claim 10, wherein aggregating the third set of higher order feature representations comprises communicating non-local information corresponding to each higher order feature representation in the third set of higher order feature representations.

18. The system of claim 10, wherein aggregating the first set of higher order feature representations into the second set of higher order feature representations comprises performing a plurality of spatial operations.

* * * * *